United States Patent
Wallman et al.

(10) Patent No.: US 7,823,959 B2
(45) Date of Patent: Nov. 2, 2010

(54) PEDESTRIAN SAFETY STRUCTURE FOR A MOTOR VEHICLE BODY

(75) Inventors: Mattias Wallman, Varberg (SE); Gunnar Hallneus, Göteborg (SE); Peter Blum, Partille (SE); Anders Fredriksson, Göteborg (SE); Mats Erlingfors, Jörlanda (SE); Peter Lindmark, Hisings backa (SE)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 12/207,858

(22) Filed: Sep. 10, 2008

(65) Prior Publication Data

US 2009/0072585 A1    Mar. 19, 2009

(30) Foreign Application Priority Data

Sep. 10, 2007    (EP)    ................................. 07116032

(51) Int. Cl.
*B60J 7/00* (2006.01)
(52) U.S. Cl. ................................. 296/187.04; 293/120
(58) Field of Classification Search ............ 296/187.04, 296/187.09, 193.11; 180/271, 274, 69.21; 701/301; 280/735; 340/436; 293/120
See application file for complete search history.

(56) References Cited

U.S. PATENT DOCUMENTS

| | | | |
|---|---|---|---|
| 6,554,332 B1 * | 4/2003 | Schuster et al. | ............. 293/102 |
| 6,676,179 B2 * | 1/2004 | Sato et al. | .................... 293/115 |
| 6,685,243 B1 * | 2/2004 | Evans | ......................... 293/102 |
| 6,752,450 B2 * | 6/2004 | Carroll et al. | .......... 296/187.03 |
| 7,192,080 B2 * | 3/2007 | Marijnissen et al. | ........ 296/198 |
| 7,293,809 B2 * | 11/2007 | Suzuki et al. | ............... 293/117 |
| 7,325,861 B2 * | 2/2008 | Zacheiss et al. | ........ 296/187.09 |

(Continued)

FOREIGN PATENT DOCUMENTS

DE    102 53 270 A1    6/2004

(Continued)

OTHER PUBLICATIONS

Svoboda Jiri, Kuklik Martin: "influence of Bumper Design to Lower Leg Impact Response", FISITA, [Online], Jul. 24, 2006, XPOO2465506, retrieved from the internet: URL: http://www.fisita.com/students/congress/sc06papers/F2006sc05.pdf, pp. 1-5.

(Continued)

*Primary Examiner*—Kiran B. Patel
(74) *Attorney, Agent, or Firm*—Frank A. MacKenzie; Brooks Kushman P.C.

(57) ABSTRACT

The present invention relates to a pedestrian safety structure for a motor vehicle body having a soft-nose outer skin panel and a bonnet providing an overlying structure for a grille opening reinforcing front cross member. The grille opening reinforcing front cross member carries a plurality of brackets. The brackets are designed to support loads distributed thereupon by the overlying structure, vertical (Z) loads in the range of 1.0-1.5 kN and longitudinal (X) loads in the range of 0.4-0.6 kN. The brackets are further designed for energy absorbing deformation when subjected to longitudinal (X) loads distributed thereupon by the overlying structure above 0.6 kN, such that the plurality of brackets provide an energy absorbing upper leg impact zone for the protection of pedestrians in the event of a collision with the motor vehicle.

5 Claims, 4 Drawing Sheets

U.S. PATENT DOCUMENTS

| | | | |
|---|---|---|---|
| 7,370,893 B2 * | 5/2008 | Tamada et al. | 293/120 |
| 7,390,039 B2 * | 6/2008 | Adachi et al. | 293/120 |
| 7,575,259 B2 * | 8/2009 | Hasegawa | 293/120 |
| 2004/0124667 A1 * | 7/2004 | Bosma et al. | 296/187.04 |
| 2006/0185923 A1 * | 8/2006 | Tanabe | 180/274 |

FOREIGN PATENT DOCUMENTS

| | | |
|---|---|---|
| EP | 1 193 135 A | 4/2002 |
| EP | 1757489 A | 2/2007 |
| GB | 2 328 654 A | 3/1993 |
| JP | 10 218022 A | 8/1998 |
| WO | 2007148217 A | 12/2007 |

OTHER PUBLICATIONS

Padraig Naughton: "Pedestrian Safety-Materials versus Design", DOW Automotive, [Online], Dec. 30, 2005, XPOO2465507, Germany, retrieved from the internet: URL: http://www.tno-automotive.cn/knowledge/MADYMO_UM/2000International/P10.pdf, pp. 1-4.

European Patent Office, Extended European Search Report for the corresponding European Patent Application No. 07116032.9-1264 mailed Feb. 12, 2008.

* cited by examiner

PEDESTRIAN SAFETY STRUCTURE FOR A MOTOR VEHICLE BODY

TECHNICAL FIELD

The present invention relates to a pedestrian safety structure for a motor vehicle body having a soft-nose outer skin panel arranged in front of a grille opening reinforcing front cross member in accordance with the preamble of claim 1.

BACKGROUND OF THE INVENTION

Pedestrian safety is an important issue with an ever increasing number of vehicles on our roads. The majority of pedestrian crashes involve a forward moving vehicle, such as a car. During such a crash, a standing or walking pedestrian is struck by the front part of the vehicle and accelerated to the speed of the vehicle and then continues forward as the vehicle brakes to a halt. In such a crash the front part of the vehicle or bonnet leading edge often hits the upper leg, e.g. thigh or pelvis, of the pedestrian potentially causing limb injuries.

In a pedestrian vehicle crash situation as above it is desirable that the pedestrian's contact with the vehicle be as "forgiving" as possible so as to minimize possible injury to the pedestrian. However, at the same time the front part of the vehicle has to withstand a number of demands put thereupon in its daily use, such as the vehicle being pushed and persons sitting thereupon.

Solutions are known that adopt the passive shape of the front part of the vehicle, according to a from a production aspect advantageous so-called "soft nose" configuration often constructed from a thermoplastic material, which partially also will serve to mitigate collisions with pedestrians. By "Soft nose" is often referred to a front bumper cover which meets the bonnet of the vehicle at a rearward position. However, the main problem normally remains, that the energy created by the impact is not absorbed in a sufficient manner so as to reduce the range of injuries.

A previous attempt to address the above problems is shown in JP 10218022, which relates to an arrangement for reducing injury of a leg part or the like of a pedestrian, in the case that the pedestrian collides against a front part of a car body. The arrangement relates to a front part structure for an automobile body. A car body outer panel arranged between a hood panel and a front panel is provided with an inner panel, which is an energy absorbing amount control member lined to the outer panel. The outer panel is supported at a front end part of the car body by a plurality of support stays arranged for a buckling deformation function, so that by a synergetic effect of plastic deformation of the car body panel and buckling deformation of the support stays, shock energy can be effectively absorbed.

Although, this kind of solution may provide cushioning effect when impacted by a pedestrian this ability is usually difficult to reconcile with the demands put upon the bonnet in its daily use, as exemplified above.

SUMMARY OF THE INVENTION

An object of the present invention is to provide an improved pedestrian safety structure for a vehicle body that may eliminate or at least reduce the problems described above. A specific object is to provide an improved pedestrian safety structure for a vehicle body that may at least reduce upper leg injuries received by a pedestrian in the event of a collision with a vehicle equipped with such a pedestrian safety structure.

According to a first aspect of the present invention this object is achieved in accordance with claim 1, which specifies a pedestrian safety structure for a motor vehicle body having a soft-nose outer skin panel and a bonnet providing an overlying structure for a grille opening reinforcing front cross member, and is characterised in that said grille opening reinforcing front cross member carries a plurality of brackets protruding towards the front of said vehicle, said plurality of brackets being designed to support vertical loads distributed thereupon by said overlying structure in the range of 1.0-1.5 kN and longitudinal loads distributed thereupon by said overlying structure in the range of 0.4-0.6 kN and said brackets further being designed for energy absorbing deformation when subjected to longitudinal loads distributed thereupon by said overlying structure above 0.6 kN such that said plurality of brackets provide an energy absorbing upper leg impact zone for the protection of pedestrians in the event of a collision with the motor vehicle.

Further embodiments are listed in the dependent claims.

It will be appreciated that features of the invention are susceptible to being combined in any combination without departing from the scope of the invention as defined by the accompanying claims.

BRIEF DESCRIPTION OF THE DRAWINGS

By way of example only, embodiments of the present invention will now be described with reference to the accompanying drawings wherein.

Figure 1:
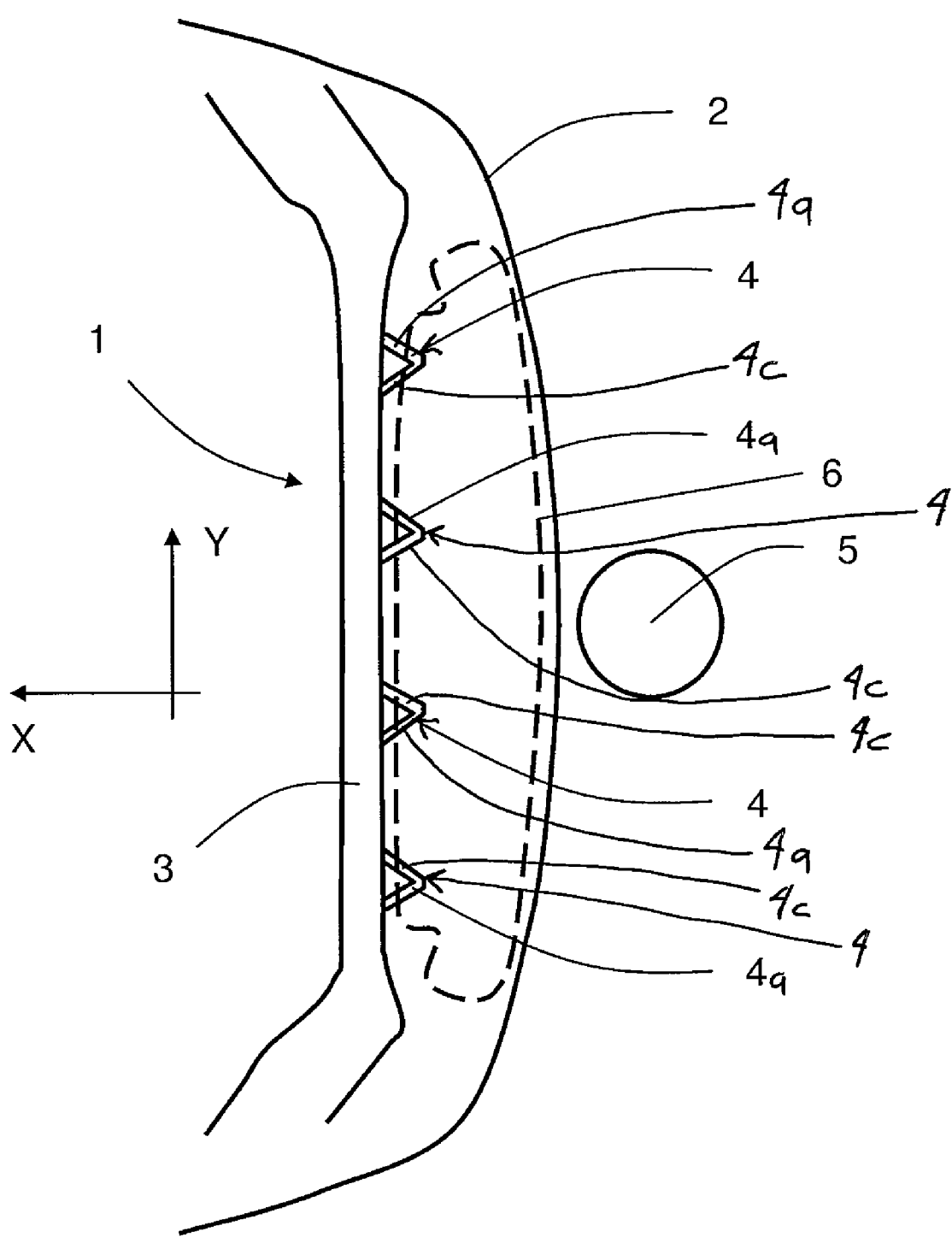
FIG. 1 schematically illustrates front part structure of a motor vehicle body being provided with the pedestrian safety structure in accordance with the present invention in a view from above.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein. The same reference numerals will be used for illustrating corresponding features in the different drawings.

DETAILED DESCRIPTION OF PREFERRED EMBODIMENTS

The present invention relates to pedestrian safety structures 1 for motor vehicle bodies having soft-nose outer skin panels 2 arranged in front of grille opening reinforcing front cross members 3. As used herein, the term soft-nose refers to a front bumper cover which meets the bonnet of the vehicle at a rearward position, the soft-nose often being constructed from a plastic or composite material providing a deformable structure which is advantageous from a production aspect but also will help mitigate collisions with pedestrians.

A vehicle body, generally indicated by reference numeral 1, includes a soft-nose outer skin panel 2 and a bonnet (not shown), which provides an overlying structure for a grille opening reinforcing front cross member 3. The grille opening reinforcing front cross member 3 carries a plurality of V-shaped brackets 4, which protrude towards the front of the vehicle. The brackets 4 may be welded or clinched to the grille opening reinforcing front cross member 3, or attached in any other suitable manner. Furthermore, during attachment of the brackets 4 positioning may easily be adjusted in the vertical Z and lateral Y directions. The brackets 4 may be made from stamped and welded steel, die cast aluminium or magnesium, or other suitable alloys or materials capable of energy absorbing deformation.

The attached plurality of brackets 4 are designed to support vertical Z loads distributed thereupon by the overlying structure in the range of 1.0-1.5 kN and longitudinal X loads distributed thereupon by the overlying structure in the range of 0.4-0.6 kN, in order to accommodate for persons sitting at the overlaying structure, such as the soft-nose outer skin panel 2 or the vehicle bonnet (not shown), and the vehicle being pushed backwards by one or more persons pushing at the surrounding structure, such as the soft-nose outer skin panel 2 or the vehicle bonnet (not shown). The brackets 4 are further designed for energy absorbing deformation when subjected to longitudinal X loads distributed thereupon by the overlying structure above 0.6 kN, such as the forces resulting from an impact with a pedestrian upper leg 5. Such an impact will usually occur downwards at an angle between 0 and 35° to the longitudinal X direction. In such a scenario of a collision between the motor vehicle and a pedestrian the plurality of brackets 4 will provide an energy absorbing upper leg 5 impact zone for the protection of the pedestrian impacted.

As illustrated in dashed lines in FIG. 1, a reinforcing energy beam 6 may alternatively be arranged between the soft-nose outer skin panel 2 and the plurality of brackets 4, such that it will be brought into contact with at least one of the brackets 4 in the event of a pedestrian collision with the motor vehicle deforming the soft-nose outer skin panel 2. The energy beam 6 will thereby provide for earlier upper leg 5 engagement in the case of a collision between the motor vehicle and a pedestrian. The earlier upper leg 5 engagement allows the crash energy from the pedestrian upper leg 5 to be absorbed in an efficient manner and will thereby reduce the required intrusion distance.

The energy beam 6 may be attached to one or more of: the soft-nose outer skin panel 2; the grille opening reinforcing front cross member 3 through a weak connection; one or more of the brackets 4. For ease of mounting during assembly of the vehicle, the energy beam 6 may be sub assembled in the soft-nose outer skin panel 2. Further, the energy beam 6 may be made from steel, aluminium, suitable metal alloys or plastic or combinations thereof.

Figure 2:
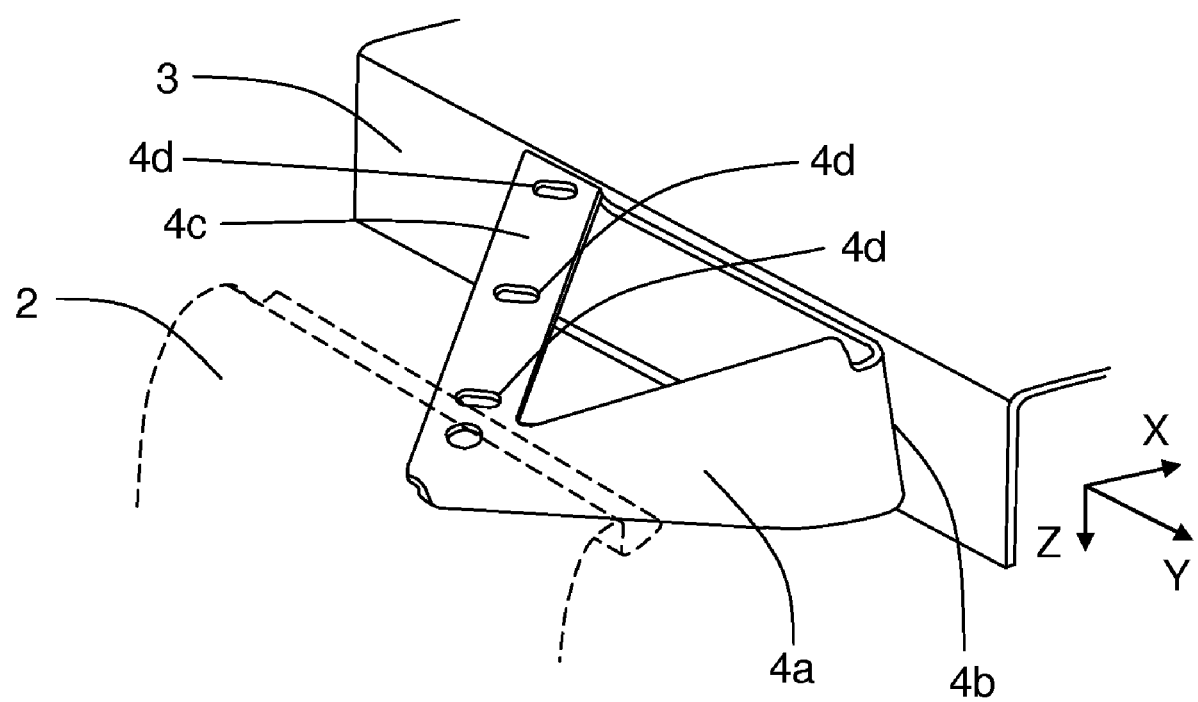
FIG. 2 schematically illustrates a grille opening reinforcing front cross member carrying a bracket of the pedestrian safety structure in accordance with the present invention.
Figure 3:
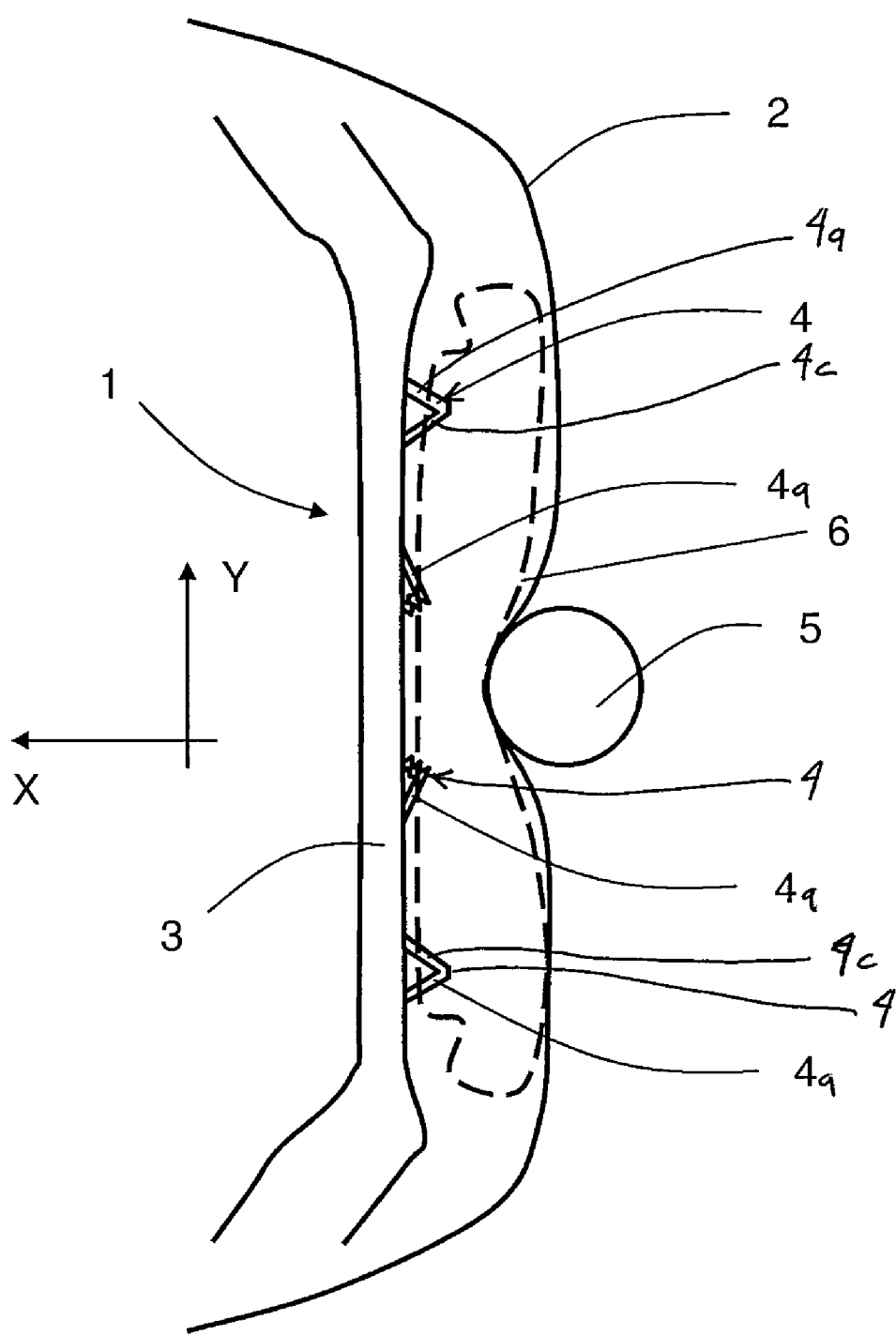
FIG. 3 schematically illustrates the front part structure of a motor vehicle body of FIG. 1 during impact with a pedestrian upper leg.

As shown in FIG. 2 each bracket 4 is V-shaped and has leg 4a which protrudes from the grille opening reinforcing front cross member 3 and slants at an angle from a longitudinal X direction. The leg 4a is constructed so as to be deformed in energy absorbing rotation, or folding, as shown in FIG. 4, along a hinge 4b at its attachment to the grille opening reinforcing front cross member 3 in the event of a pedestrian collision with the motor vehicle that causes the soft-nose skin panel 2 to deform rearward and thereby apply a longitudinal impact load to the bracket 4.

Each bracket 4 also has a leg 4c, as shown in FIG. 2, protruding from the grille opening reinforcing front cross member 3 and slanting at an angle from a longitudinal X direction. The leg 4c is, as shown in FIG. 4, constructed so as to be deformed in energy absorbing buckling in the event of a pedestrian collision with the motor vehicle that causes the soft-nose skin panel 2 to deform rearward and thereby apply a longitudinal impact load to the bracket 4.

Figure 4:
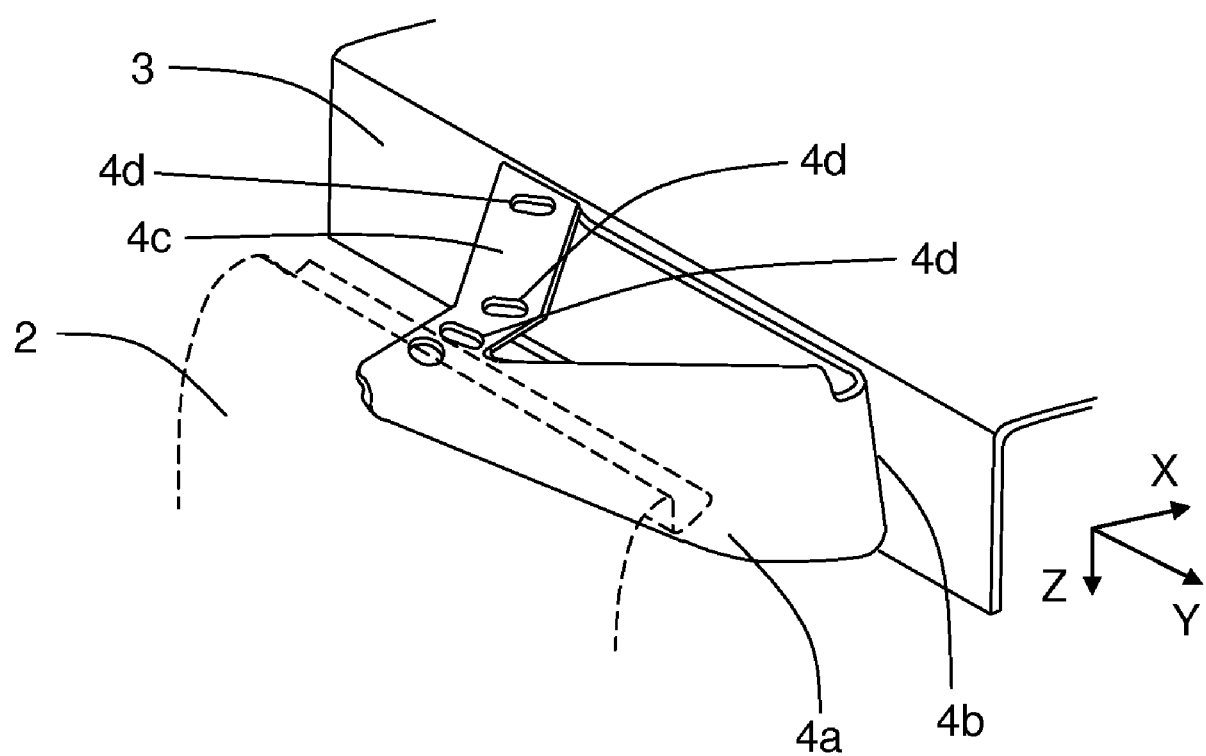
FIG. 4 schematically illustrates the bracket of FIG. 2 during impact with a pedestrian upper leg.

Each leg 4c of the brackets 4 may, as shown in FIG. 4, be provided with one or more notches 4d for promoting the energy absorbing buckling deformation in the event of a pedestrian collision with the motor vehicle that causes the soft-nose skin panel 2 to deform rearward and thereby apply a longitudinal impact load to the bracket 4.

As evident from FIGS. 2 and 4 the legs 4a of the brackets 4 may be constructed to support, without permanently deforming, higher vertical Z loads than longitudinal X loads. This may be achieved through a cross section of leg 4a having a dimension in the vertical Z direction that is greater than its dimension in the transverse Y direction. Such a cross section will enable the legs 4a to support the load of e.g. a person sitting at an overlaying structure such as the soft-nose outer skin panel 2 or a bonnet (not shown) of the vehicle.

Depending on the overall design of the vehicle, such as placement of headlights and other details, the brackets 4 may be provided along the entire grille opening reinforcing front cross member 3 or alternatively the brackets 4 may be provided along a central portion of the grille opening reinforcing front cross member 3, e.g. in-between the headlights of the vehicle.

Thus, through this proposed plurality of brackets 4 arranged between the overlying structure and the grille opening reinforcing front cross member 3, a local deformation is enabled that minimizes the involved mass and thereby also provides for a reduced upper leg 5 reacting force in the event of a pedestrian collision with the motor vehicle. The design of the pedestrian safety structure 1 is such that the energy generated during impact, such as caused by a collision with a pedestrian upper leg 5, is absorbed by virtue of the brackets 4 undergoing deformation to absorb the impact energy, i.e. energy absorption takes place mainly due to local plastic deformation controlled by the configuration of the plurality of brackets 4.

Furthermore, in accordance with the present invention is also envisaged an automotive vehicle, which comprises such a pedestrian safety structure 1 for a motor vehicle body as described above.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pedestrian safety structure for a motor vehicle body comprising:
   a front cross member extending in a generally transverse direction relative to the motor vehicle body;
   a soft-nose outer skin panel disposed forward of the front cross member; and
   a plurality of V-shaped brackets disposed between the soft-nose outer skin panel and the front cross member, the brackets structurally supported by and protruding forwardly from the cross member, at least one of the brackets comprising a first leg having a hinge adjacent its attachment to the front cross member, the hinge promoting a rotational deformation of the first leg about the hinge when a longitudinal impact load is applied to the bracket caused by rearward deformation of the soft-nose outer skin panel, and the at least one bracket further comprising a second leg constructed to promote a buckling deformation of the second leg when the longitudinal impact load is applied to the bracket.

2. Pedestrian safety structure according to claim 1, further comprising a reinforcing energy beam disposed between the soft-nose outer skin panel and the plurality of brackets such that it will transfer the longitudinal impact load to the bracket.

3. Pedestrian safety structure according to claim 1, wherein the second leg comprises one or more notches for promoting the buckling deformation of the second leg.

4. Pedestrian safety structure according to claim 1, the at least one bracket is constructed to support higher vertical loads than longitudinal loads without permanently deforming.

5. Pedestrian safety structure according to claim 4 wherein the at least one bracket is designed to support a vertical load in a range of 1.0-1.5 kN without permanently deforming and to support a longitudinal load in a range of 0.4-0.6 kN without permanently deforming.

* * * * *